(12) United States Patent
Ganter

(10) Patent No.: US 8,256,313 B2
(45) Date of Patent: Sep. 4, 2012

(54) ACTUATOR WITH LINEARLY MOVABLE DRIVE SCREW

(75) Inventor: Brian Ganter, Foxborough, MA (US)

(73) Assignee: Stoneridge Control Devices, Inc., Canton, MA (US)

( * ) Notice: Subject to any disclaimer, the term of this patent is extended or adjusted under 35 U.S.C. 154(b) by 378 days.

(21) Appl. No.: 12/714,040

(22) Filed: Feb. 26, 2010

(65) Prior Publication Data

US 2010/0242642 A1   Sep. 30, 2010

Related U.S. Application Data

(60) Provisional application No. 61/156,136, filed on Feb. 27, 2009.

(51) Int. Cl.
*B60K 17/04*   (2006.01)

(52) U.S. Cl. ............... 74/335; 74/424.71; 74/473.12

(58) Field of Classification Search ............ 74/335, 74/413, 421 R, 421 A, 424.71, 473.12
See application file for complete search history.

(56) References Cited

U.S. PATENT DOCUMENTS

| | | | |
|---|---|---|---|
| 2,854,113 A * | 9/1958 | Hallden | 192/141 |
| 3,682,283 A * | 8/1972 | Sato | 192/141 |
| 4,635,491 A | 1/1987 | Yamano et al. | |
| 5,775,469 A * | 7/1998 | Kang | 188/267 |
| 5,788,008 A * | 8/1998 | Fort et al. | 180/247 |
| 5,809,833 A * | 9/1998 | Newport et al. | 74/89.37 |
| 2006/0169084 A1 | 8/2006 | Meaney et al. | |

FOREIGN PATENT DOCUMENTS

FR   2812056   1/2002

OTHER PUBLICATIONS

Combined Search and Examination Report dated Jun. 23, 2010 issued in related United Kingdom Patent Application No. GB1003341.3.
Office Action dated Apr. 6, 2011 issued in related United Kingdom Patent Application No. GB1003341.3.

* cited by examiner

*Primary Examiner* — Ha D. Ho
(74) *Attorney, Agent, or Firm* — Grossman, Tucker, Perreault & Pfleger, PLLC

(57) ABSTRACT

An actuator and vehicle system including a drive gear with an integral drive nut in meshing engagement with a drive screw. The drive screw is prevented from rotating such that rotation of the drive gear causes linear motion of the drive screw.

16 Claims, 8 Drawing Sheets

ACTUATOR WITH LINEARLY MOVABLE DRIVE SCREW

CROSS-REFERENCE TO RELATED APPLICATIONS

This application claims the benefit of the filing date of U.S. Provisional Application Ser. No. 61/156,136, filed Feb. 27, 2009, the teachings of which are hereby incorporated herein by reference.

TECHNICAL FIELD

This disclosure relates to actuator assemblies, and, in particular, to an actuator with a linearly movable drive screw.

BACKGROUND

Actuators including drive screws are well-known. In general, such actuators may include an electric motor having an output shaft coupled through a gear train to a worm gear. The worm gear may be in meshing engagement with the drive screw for causing rotation of the drive screw corresponding to rotation of the output shaft of the motor. In known configurations, the drive screw is fixed in position relative to the actuator housing, and rotation of the drive screw causes translation of a threaded drive nut along the length of the drive screw. The nut may be coupled to an object to be driven by the actuator.

The drive screw configuration provides advantages in establishing linear movement, i.e. of the drive nut, while being generally difficult to back-drive by applying an external force to the drive nut. In some configurations, however, a lengthy drive screw may be required to achieve the desired range of motion for the drive nut. This can result in a risk of bending of the drive screw and damage to the actuator. Also, a long drive screw may not be able to withstand high loads due to a limitation associated with the size of the thrust bearing that may be used with the screw.

BRIEF DESCRIPTION OF THE DRAWINGS

Features and advantages of embodiments of the disclosed subject matter will become apparent as the following Detailed Description proceeds, and upon reference to the Drawings, where like numerals depict like parts, and in which.

Although the following Detailed Description will proceed with reference being made to illustrative embodiments, many alternatives, modifications, and variations thereof will be apparent to those skilled in the art. Accordingly, it is intended that the claimed subject matter be viewed broadly.

DETAILED DESCRIPTION

In general, an actuator consistent with the present disclosure includes a drive gear including an integral drive nut in meshing engagement with a drive screw. The drive screw is prevented from rotating such that rotation of the drive gear causes linear motion of the drive screw relative to the drive gear and the actuator housing. This configuration allows the drive screw to be short, reducing the risk of bending, and allows the use of a large thrust bearing to withstand the high loads. The linear motion of the drive screw may be directly sensed, e.g. via Hall Effect circuitry and magnets. The drive screw may drive a plunger to actuate an associated system, e.g. a vehicle gear box such as a two-wheel-drive (2WD) to four-wheel-drive (4WD) actuator system. Two springs may be used in the plunger to maximize the driving force while minimizing the space required. The springs may be reverse wound to prevent nesting and tangling during handling and/or actuation.

For ease of explanation, an actuator consistent with the disclosure may be described herein in connection with the operation of a gear box, such as a transfer case of a 4WD vehicle, vehicle front differential, vehicle rear differential, transmission, etc. It will be appreciated, however, that an actuator consistent with the disclosure will be useful in connection with a variety of applications in and out of vehicles, such as stabilizer bars, parking brakes, interlocks, etc. It is to be understood, therefore, that illustrated exemplary embodiments described herein are provided only by way of illustration, and are not intended to be limiting.

Figure 1:
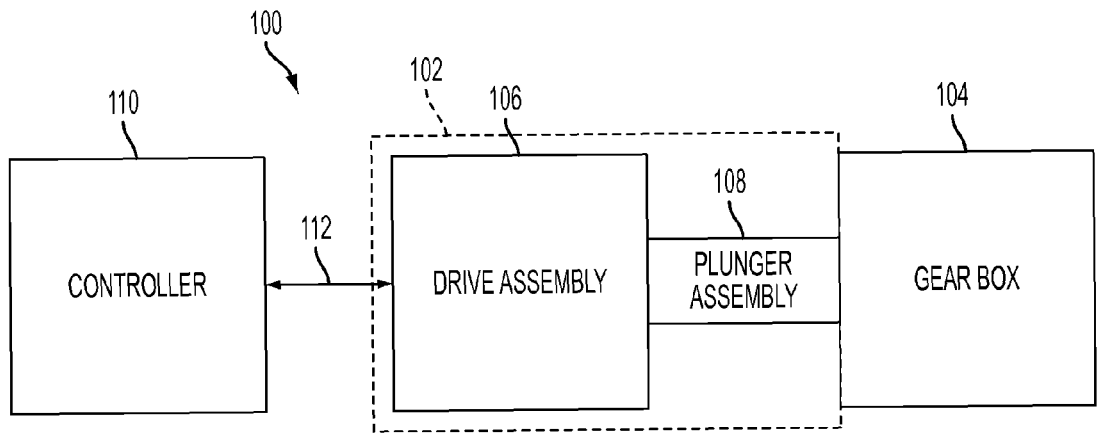
FIG. 1 is a block diagram of a vehicle system including an actuator consistent with the present disclosure.

FIG. 1 is a block diagram of a system 100 including an actuator 102 coupled to a gear box 104. Consistent with the present disclosure the gear box 104 may include a transfer case, a front differential, a rear differential, etc. The actuator 102 includes a drive assembly 106 for driving a plunger of a plunger assembly 108. The plunger of the plunger assembly 108 engages the gear box 104 and/or one or more components within the gear box 104 for moving a movable element associated with the gear box between a first operating state and a second operating state. For example, in an embodiment in which the gear box 104 is a transfer case of a four-wheel-drive vehicle, the plunger of the plunger assembly 108 may act on a shift fork within the gear box 104 for shifting the transfer case between all-wheel-drive (AWD) and 4WD. The actuator 102 may be directly coupled to the gear box 104, or may be indirectly coupled to the gear box 104, as through intermediary linkages, etc. The actuator 102 may operate in response to a control signal from a controller 110. The controller 110 may provide the control signal to the actuator 102 over a communication bus 112, such as a CAN or LIN bus. The actuator 102 may provide a status signal to the controller on the bus 112, e.g. to indicate the position of the plunger of the plunger assembly 108.

Figure 2:
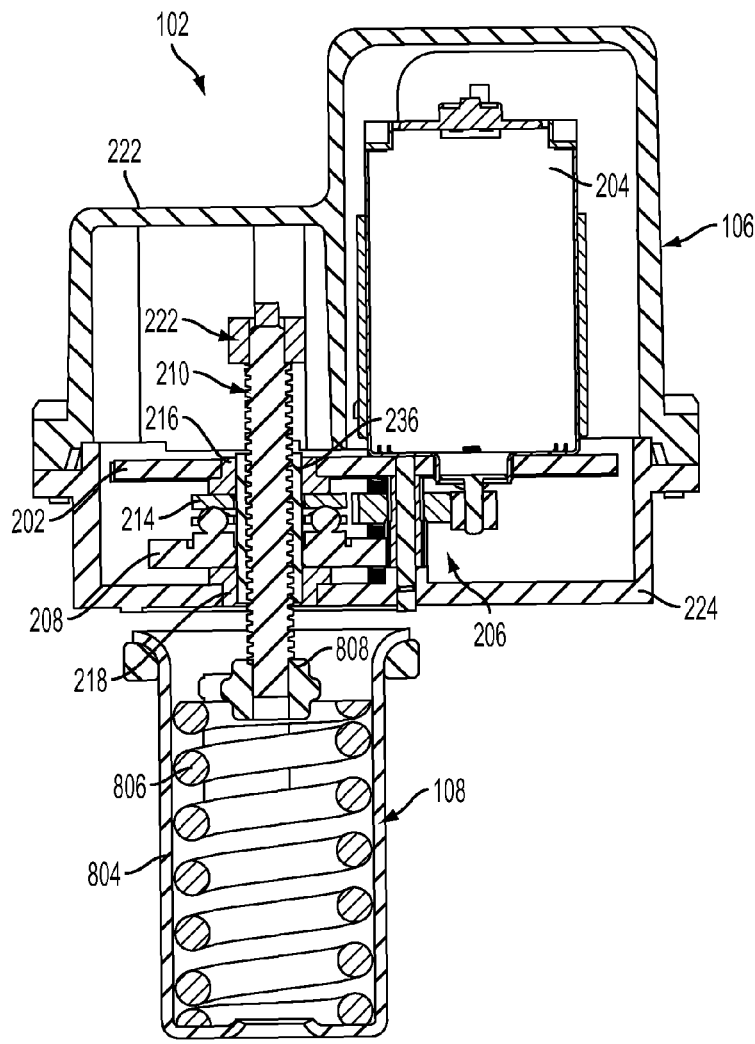
FIG. 2 is a sectional view of an actuator consistent with the present disclosure.
Figure 3:
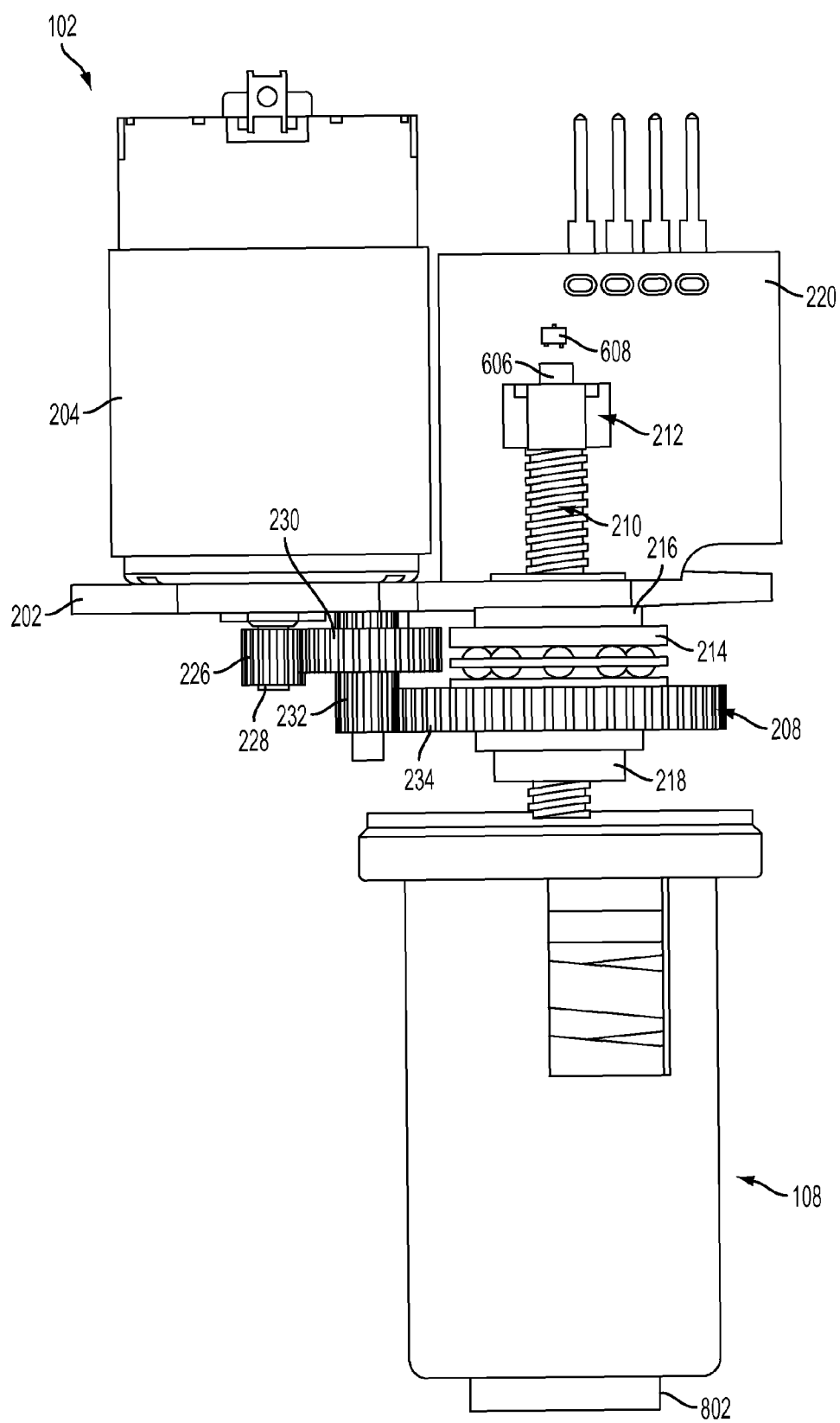
FIG. 3 is a top view of an actuator consistent with the present disclosure with a housing removed.

Turning to FIGS. 1 and 2, there is shown an exemplary actuator 102 including a drive assembly 106 and a plunger assembly 108 consistent with the present disclosure. The drive assembly 106 generally includes a support frame 202, a reversible electric motor 204, a reduction gear train 206, a drive gear 208, a drive screw 210, an anti-rotation feature 212, a thrust bearing 214, seals 216, 218, a printed circuit board (PCB) 220, and first 222 and second 224 housing portions. The reversible electric motor 204, reduction gear train 206 and the PCB 220 are mounted to the support frame 202.

The motor 204 is configured for driving the drive gear 208 through the reduction gear train 206. Those of ordinary skill in the art will recognize that the reduction gear train 206 can take a variety of configurations depending upon the rotational speed of the motor 204 and the desired gear reduction. In the illustrated exemplary embodiment, the reduction gear train includes pinion 226 on the output shaft 228 of the motor 204 and in meshing engagement with a first gear 230 of a compound gear. A second gear 232 of the compound gear is in meshing engagement with a first gear portion 234, e.g. a spur gear portion, of the drive gear 208.

Figure 4:
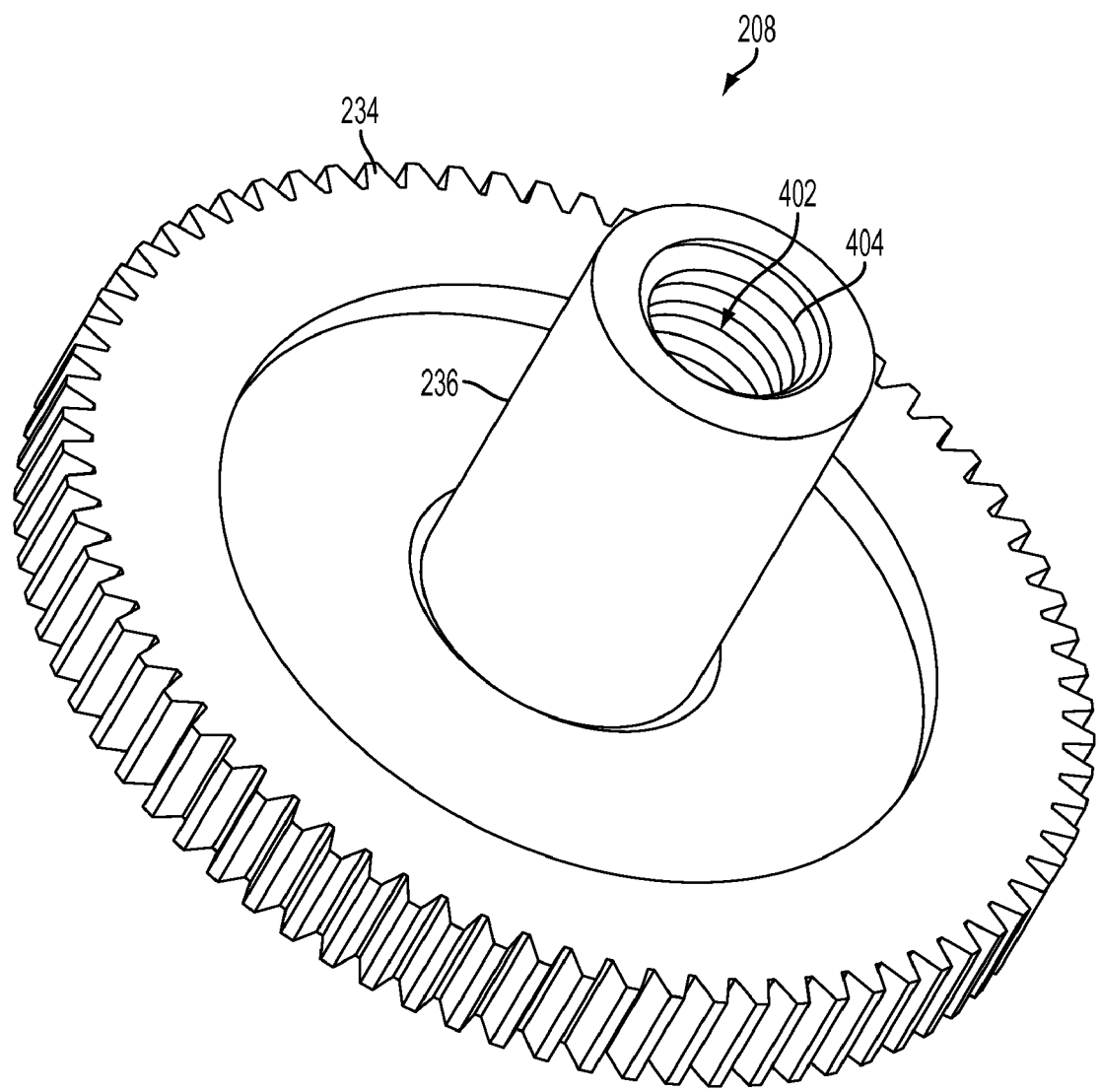
FIG. 4 is a perspective view of a drive gear including a first gear portion and an integral drive nut consistent with the present disclosure.

The drive gear 208 includes the spur gear portion 234 and an integral drive nut 236, as shown for example in FIG. 4. The integral drive nut 236 extends coaxially through the spur gear portion 234 and axially outward at both sides of the spur gear portion 236. The integral drive nut defines an internally threaded passage 402 for receiving the externally threaded drive screw 210. The external threads 502 on the drive screw 210 meshingly engage the internal threads 404 on the integral drive nut 236. A first end of the drive nut extends into an opening in the seal 216 which disposed in a corresponding opening in the support frame 202. The support frame 202 thereby supports the drive screw 210 and drive gear 208. The thrust bearing 214 includes a central opening through which the drive nut 236 passes, and is provided between a face surface of the seal 216 and a rear face surface of the spur gear portion 234 of the drive gear 208.

The first 222 and second 224 housing portions have open ends, and mate to enclose the motor 204, PCB 220, reduction gear train 206, and drive gear 208 with an end of the drive screw 210 extending outwardly from the second housing portion 224. In the illustrated exemplary embodiment, a second end of the drive nut 234 extends into an opening in the seal 218, which is disposed in a corresponding opening in the second housing portion 224. The second housing portion thus supports the drive screw 210 and the drive gear 208.

Figure 6:
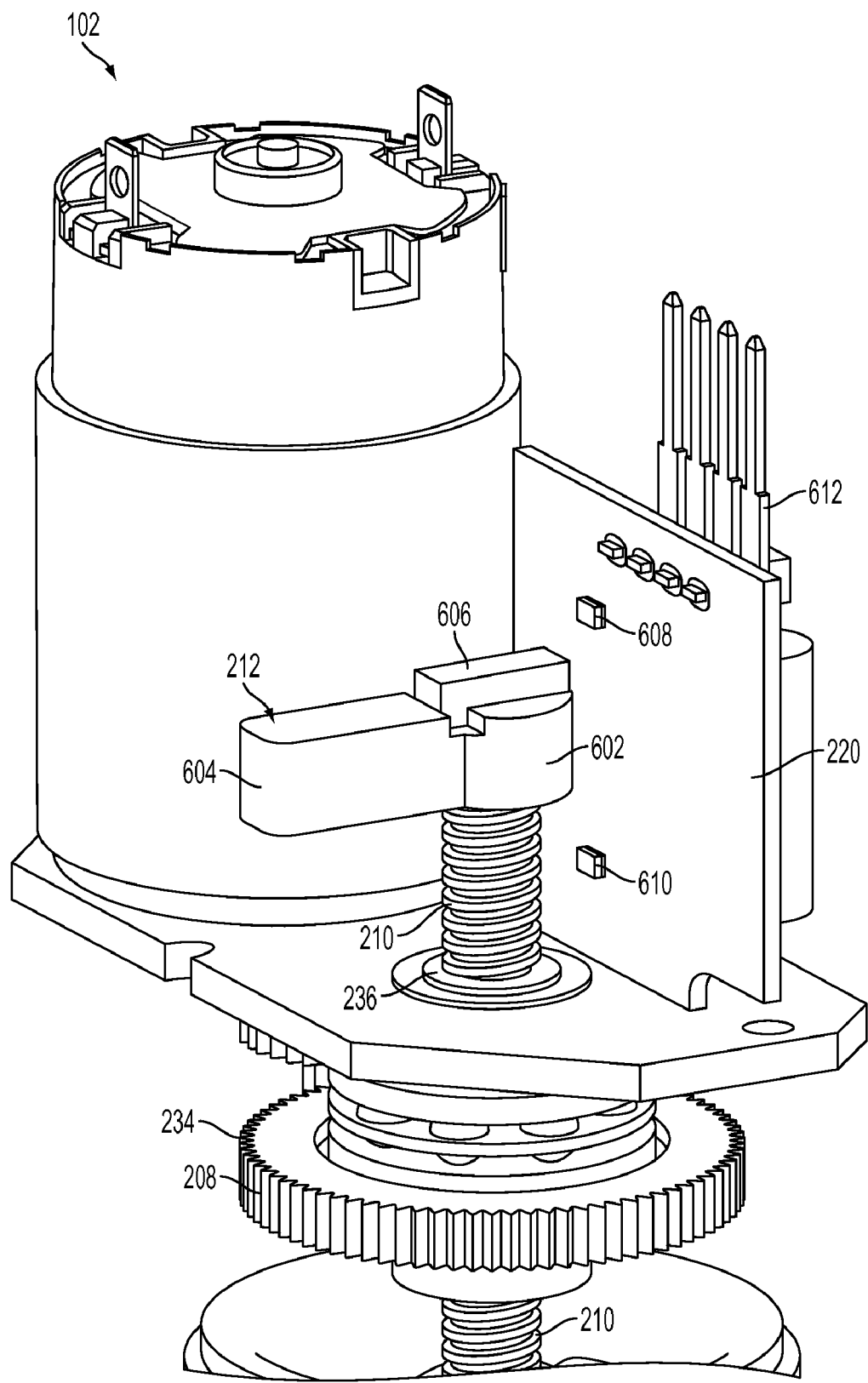
FIG. 6 is a perspective view of a portion of an actuator consistent with the present disclosure.
Figure 7:
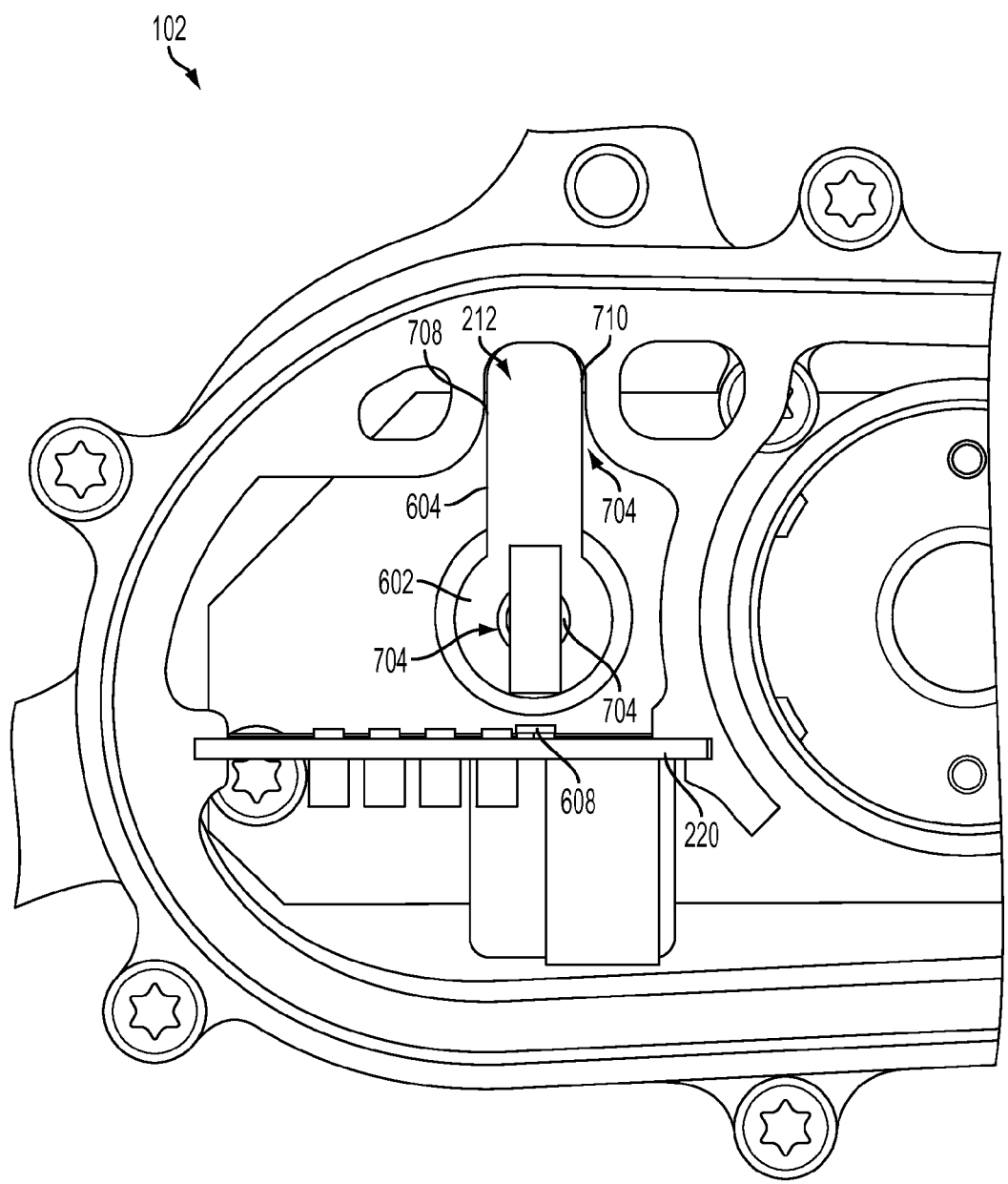
FIG. 7 is another sectional view of an actuator consistent with the present disclosure.

As shown particularly in FIGS. 6 and 7, the anti-rotation feature 212 may be affixed to a first end 702 the drive screw 210. In the illustrated embodiment, the anti-rotation feature includes a generally circular base portion 602 and a tab portion 604 extending radially therefrom. The circular base portion 602 includes a central opening 704 for receiving the first and 702 of the drive screw 210. The end of the drive screw is secured in the central opening 704 of the base portion 602 of the anti-rotation feature 212 such that relative rotational movement between the anti-rotation feature 212 and the drive screw 210 is substantially prevented. In one embodiment, for example, a key portion of the central base portion 602 may extend into the central opening 704 and may be received in a mating key portion formed in the drive screw 210 to substantially prevent relative rotational movement between the anti-rotation feature 212 and the drive screw 210. As used herein rotational movement is "substantially prevented" and the anti-rotation is configured to "substantially prevent" rotation, means that some relative movement between the components due to manufacturing tolerances or through a force that destroys or damages components may be possible, but free rotational movement between the components is prevented.

As shown in FIG. 7, the tab portion 604 of the anti-rotation feature 212 may extend into a guide slot 706 of the first housing portion. The guide slot 706 may be formed by opposed walls 708, 710 extending inwardly from the interior surface of the first housing portion 222. Opposite sides of the tab portion 604 may be disposed adjacent the opposed walls 708, 712 of the guide slot 706 in a manner that allows linear movement of the tab portion 604 in the slot by that substantially prevents rotational movement of the tab portion 604 in the guide slot 706. The guide slot 706 may extend along the length of the first housing portion 222 in alignment with the axis of the drive screw 210.

Figure 5:
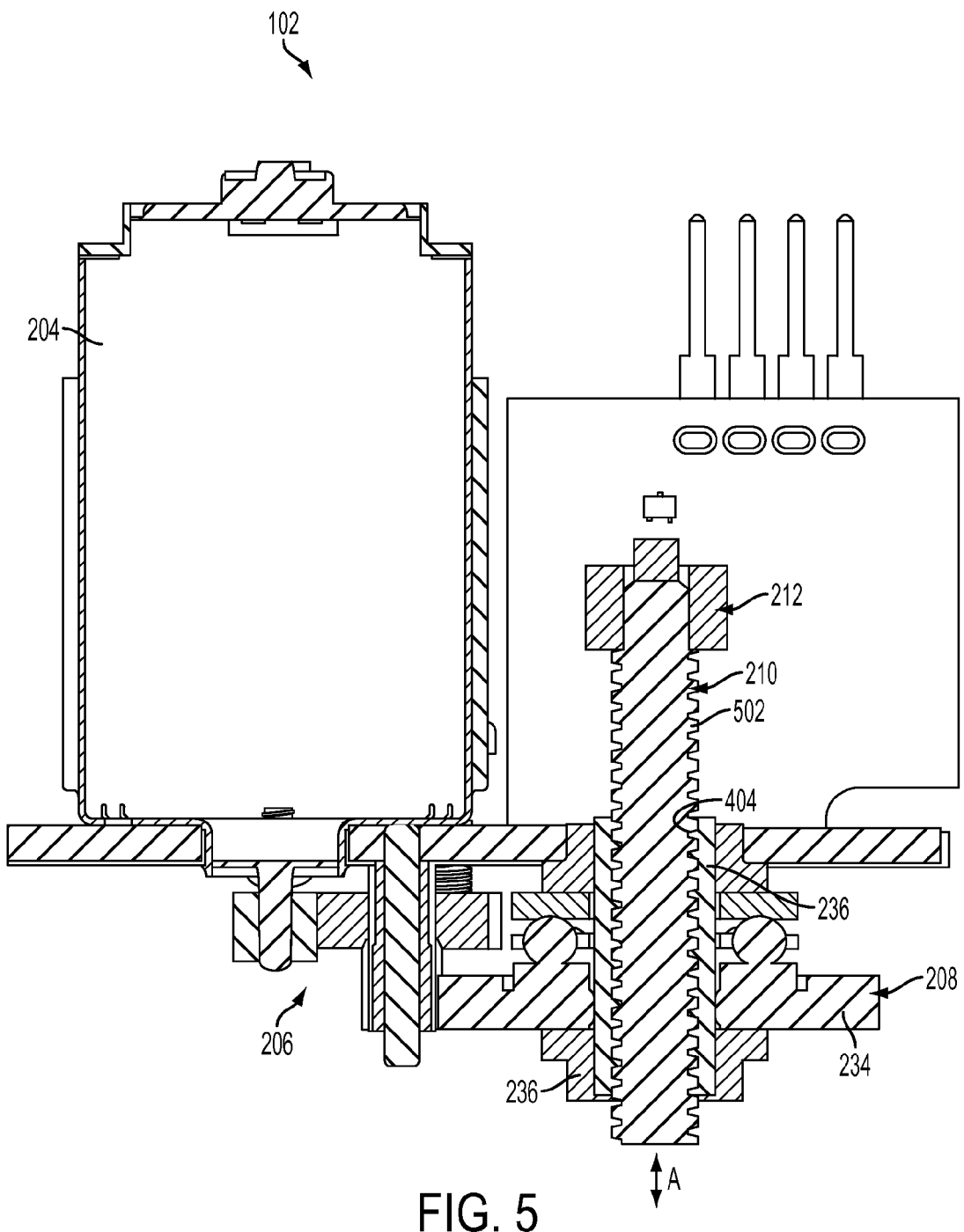
FIG. 5 is sectional view of a portion of an actuator consistent with the present disclosure.

In operation, the motor 204 may be energized in a first direction to cause corresponding rotation of the drive gear 208 through the reduction gear train 206. With the anti-rotation feature affixed to the end of the drive screw and the tab portion of the anti-rotation feature 212 disposed in the guide slot 706, the drive screw 210 is substantially prevented from rotation. As the drive gear 208 rotates, therefore, meshing engagement of the internal threads of the drive nut portion 236 of the drive gear 208 and the external threads on the drive screw 210 causes linear motion of the drive screw 210 relative to the drive nut 236 and the housing portions 222 and 224. The linear motion is in a direction along the longitudinal axis of the drive screw 210, i.e. in the direction of the arrow A in FIG. 5 depending on the direction of rotation of the motor output shaft. As the drive screw 210 moves linearly relative to the drive nut 236, the tab portion 604 of the anti-rotation feature 212 linearly slides in the guide slot 706.

Linear motion of the drive screw 210 causes corresponding linear movement of the plunger 802 portion of the plunger assembly 108. As shown, for example, in FIGS. 8 and 9, the plunger assembly 108, 108a may include a plunger housing 804, a plunger 802 and at least one spring 806. The housing 804 may be generally cylindrical with an open end through which the plunger 802 may pass. The plunger 802 may also be generally cylindrical and may have an outside diameter smaller than an inside diameter of the plunger housing 804. The plunger 802 may therefore be slidably positioned within housing 804.

The plunger 802 may be coupled to the drive screw 210 through the spring 806. For example, as shown, the spring 806 may be disposed between an interior surface of the end of the plunger 802 portion and an end feature 808 coupled to the second end of the drive screw 210. As the drive screw 210 moves linearly outward from the drive assembly it may force the spring 806 against the end portion of the plunger 802 to thereby force the plunger 802 linearly outward from the housing portion 804. The plunger 802 may, for example, be coupled to a movable element of the gear box 104 for placing said gearbox 104 in a first operating state, e.g. all-wheel drive, when said drive screw 210 is in said first or retracted position and a second operating state, e.g. 4-wheel drive, when said drive screw is in said second or extended position.

If the plunger 802 encounters an obstruction, e.g. a blocked tooth condition in an element driven by the plunger 802, the drive screw 210 may compress the spring. The motor 204 may be deenergized to stop linear movement of the drive screw 210. When the blocked condition is released, the plunger 204 may be forced outward from the housing by the force of the spring 806. When the motor 204 is rotated in an opposite direction the drive screw 210 may move linearly inward toward the drive assembly and thereby retract the plunger 802 into the plunger housing 804.

Figure 8:
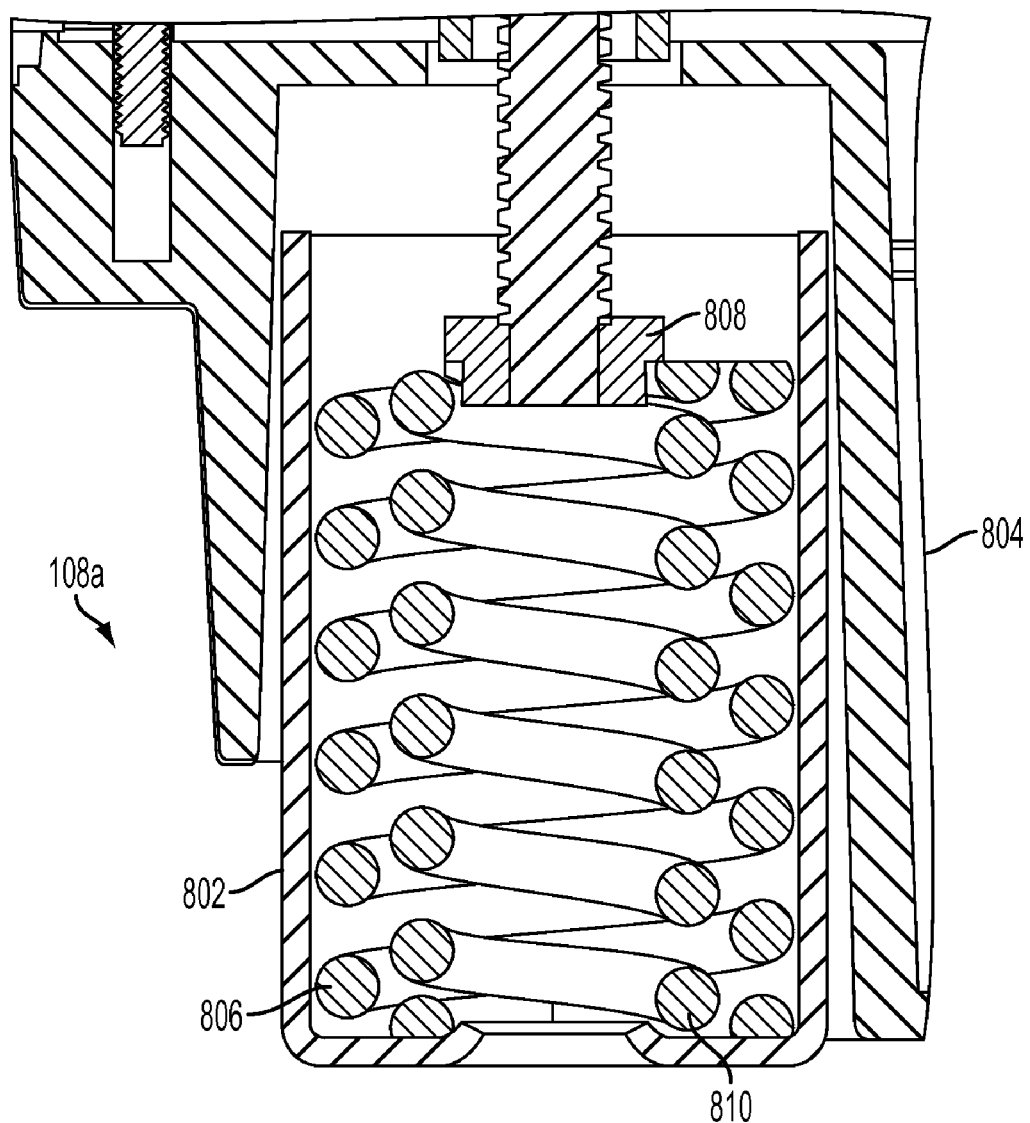
FIG. 8 is a sectional view of a plunger assembly useful in an actuator consistent with the present disclosure.

In the embodiment shown in FIG. 8, the plunger may is coupled to the drive screw through two springs 806, 810. As shown, the springs 806, 810 may be helical coil springs that are reversed wound relative to each other to prevent nesting and tangling during handling and/or actuation. The spring(s) may be selected to maximize the driving force of the plunger while minimizing the space required. Using two springs 806, 810, as shown in FIG. 8, allows for higher driving force compared to one spring within the same space required for one spring.

The actuator 102 may further include a non-contact position sensing system. As shown particularly in FIG. 6, for example, a magnet 606 may be coupled to the drive screw 210, e.g. at the first end thereof. The magnet 606 may thus move linearly with the drive screw 210 when the motor 204 is energized, and may travel over and adjacent to the PCB 220.

The PCB 220 may have at least one magnetic field sensor 608, such as a Hall Effect sensor, a flux gate sensor, reed switch, etc, mounted thereto along with associated circuits and traces for powering the sensor and providing outputs from the sensor(s) to an electrical connector 612. In the illustrated exemplary embodiment, two Hall Effect sensors 608, 610 are be disposed on the PCB 220 at locations corresponding to the end of travel positions of the drive screw 210. When the drive screw 210 is in a fully retracted position, the first Hall Effect sensor 608 may provide an output in response the magnetic field provided by the magnet 606. The output from the first Hall Effect sensor 608 may be provided to the controller 110 through the connector 612 to indicate the drive screw 210 is fully retracted. In response to the output from the first Hall Effect sensor 608, the controller may provide a signal to the actuator 102 to deenergize the motor.

When the drive screw 210 is in a fully extended position, the second Hall Effect sensor 610 may provide an output in response the magnetic field provided by the magnet 606. The output from the second Hall Effect sensor 610 may be provided to the controller 110 through the connector 612 to indicate the drive screw 210 is fully extended. In response to the output from the second Hall Effect sensor 610, the controller 110 may provide a signal to the actuator 102 to deenergize the motor.

In one embodiment, the Hall Effect sensors 608 and/or 610 may be switching Hall Effect sensors. In such an embodiment, when the magnet 606 is adjacent to, e.g., disposed above, either of the sensors, the sensor adjacent the magnet may provided an output corresponding to an "on" condition and the other sensor may provided an output corresponding to an "off" condition. Other embodiments of the position sensing system may utilize one or more linear Hall Effect devices that provide an output indicative of the position of the drive screw between end of travel positions. In related embodiments, a position sensing system may include more than two magnetic field sensors disposed along the travel path of travel of the drive screw. Additional magnetic field sensors may indicate intermediate positions of the magnet 606 and drive screw 210 between the end of travel positions, and/or for improve the resolution of the position sensing system. Further embodiments of a non-contact position sensing system consistent with the present disclosure may utilize non-contact sensors other than magnetic field sensors, such as optical sensors, etc.

Figure 9:
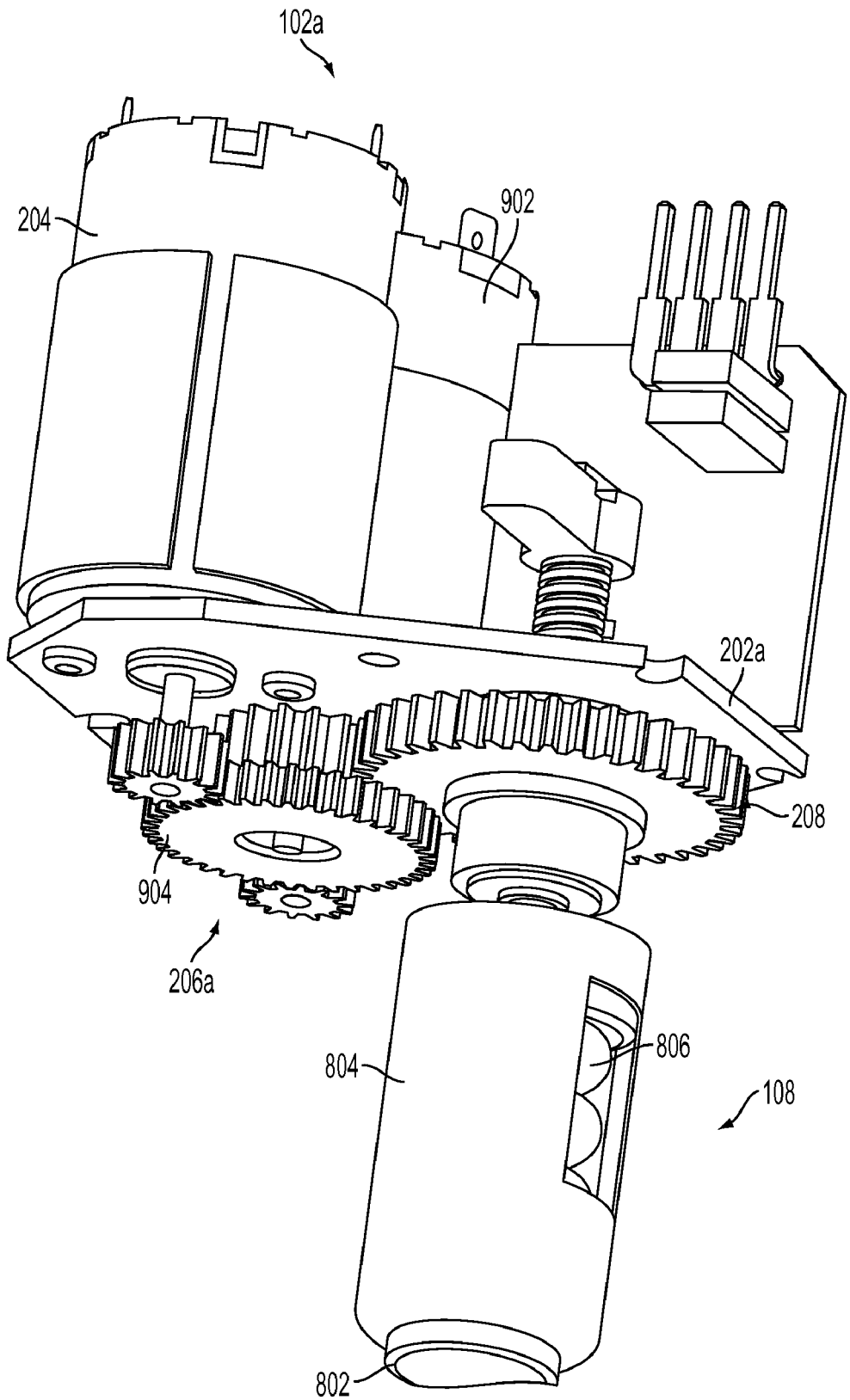
FIG. 9 is a perspective view of another actuator consistent with the present disclosure with the housing removed.

As shown in FIG. 9, an actuator consistent with the present disclosure may operate using two or more reversible electric motors. In the illustrated embodiment, the first 204 and second 902 motors are mounted to a support frame 202a and both motors drive a compound gear 904 of a reduction gear train 206a. A configuration including two motors provides fail-safe operation in the event of malfunction of one of the motors, and can also provide increased driving force. Operation of the embodiment shown in FIG. 9 is in other respects similar that described above in connection with FIGS. 1-8.

According to one aspect of the disclosure, there is thus provided an actuator including: a motor; a gear train coupled to the motor, the gear train including a drive gear including a first gear portion and an integral drive nut portion, the first gear portion being meshingly engaged with a gear of the gear train for causing rotation of the drive gear when the motor is energized; a drive screw extending into a central opening in the integral drive nut portion of the drive gear, the drive screw including external threads meshingly engaged with corresponding internal threads of the integral drive nut portion of the drive gear, whereby the integral drive nut portion of the drive gear is configured to drive the drive screw to move linearly relative to the integral drive nut portion between a first position and a second position when the motor is energized; and a plunger coupled to the drive screw through at least one spring.

According to another aspect of the disclosure, there is provided a vehicle system including: a vehicle gear box; an actuator coupled to the gearbox, the actuator including a motor; a gear train coupled to the motor, the gear train including a drive gear including a first gear portion and an integral drive nut portion, the first gear portion being meshingly engaged with a gear of the gear train for causing rotation of the drive gear when the motor is energized; a drive screw extending into a central opening in the integral drive nut portion of the drive gear, the drive screw including external threads meshingly engaged with corresponding internal threads of the integral drive nut portion of the drive gear, whereby the integral drive nut portion of the drive gear is configured to drive the drive screw to move linearly relative to the integral drive nut portion between a first position and a second position when the motor is energized; and a plunger coupled to the drive screw through at least one spring, the plunger being coupled to a movable element of the gear box for placing the gearbox in a first operating state when the drive screw is in the first position and a second operating state when the drive screw is in the second position.

The embodiments that have been described herein, however, are but some of the several which utilize features consistent with the present disclosure and are set forth here by way of illustration but not of limitation. Additionally, it will be appreciated that aspects of the various embodiments may be combined in other embodiments. It is obvious that many other embodiments, which will be readily apparent to those skilled in the art, may be made without departing materially from the spirit and scope of the invention defined in the appended claims.

What is claimed is:

1. An actuator comprising:
   a motor;
   a gear train coupled to said motor, said gear train comprising a drive gear comprising a first gear portion and an integral drive nut portion, said first gear portion being meshingly engaged with a gear of said gear train for causing rotation of said drive gear when said motor is energized;
   a drive screw extending into a central opening in said integral drive nut portion of said drive gear, said drive screw comprising external threads meshingly engaged with corresponding internal threads of said integral drive nut portion of said drive gear, whereby said integral drive nut portion of said drive gear is configured to drive said drive screw to move linearly relative to said integral drive nut portion between a first position and a second position when said motor is energized; and
   a plunger coupled to said drive screw through at least one spring.

2. An actuator according to claim 1, said actuator further comprising an anti-rotation feature coupled to said drive screw, said anti-rotation feature being configured to substantially prevent said drive screw from rotating relative to said integral drive nut portion of said drive gear.

3. An actuator according to claim 2, wherein said anti-rotation feature includes a base portion having an opening therein for receiving said drive screw and a tab portion extending radially from said base portion.

4. An actuator according to claim 3, wherein said tab portion is disposed in a guide slot provided in a housing of said actuator.

5. An actuator according to claim 1, said actuator further comprising a magnet coupled to said drive screw and at least one magnetic field sensor configured to provide an output in response to a position of said magnet.

6. An actuator according to claim 5, said actuator further comprising first and second magnetic field sensors associated with said first and second positions, respectively, each of said magnetic field sensors providing an associated output in response to a position of said magnet.

7. An actuator according to claim 1, said actuator comprising first and second ones of said springs.

8. An actuator according to claim 7, wherein said first and second ones of said springs comprise helical coil springs reverse wound with respect to each other.

9. A vehicle system comprising:
a vehicle gear box;
an actuator coupled to said gearbox, said actuator comprising:
a motor;
a gear train coupled to said motor, said gear train comprising a drive gear comprising a first gear portion and an integral drive nut portion, said first gear portion being meshingly engaged with a gear of said gear train for causing rotation of said drive gear when said motor is energized;
a drive screw extending into a central opening in said integral drive nut portion of said drive gear, said drive screw comprising external threads meshingly engaged with corresponding internal threads of said integral drive nut portion of said drive gear, whereby said integral drive nut portion of said drive gear is configured to drive said drive screw to move linearly relative to said integral drive nut portion between a first position and a second position when said motor is energized; and
a plunger coupled to said drive screw through at least one spring, said plunger being coupled to a movable element of said gear box for placing said gearbox in a first operating state when said drive screw is in said first position and a second operating state when said drive screw is in said second position.

10. A vehicle system according to claim 9, said actuator further comprising an anti-rotation feature coupled to said drive screw, said anti-rotation feature being configured to substantially prevent said drive screw from rotating relative to said integral drive nut portion of said drive gear.

11. A vehicle system according to claim 10, wherein said anti-rotation feature includes a base portion having an opening therein for receiving said drive screw and a tab portion extending radially from said base portion.

12. A vehicle system according to claim 11, wherein said tab portion is disposed in a guide slot provided in a housing of said actuator.

13. A vehicle system according to claim 9, said actuator further comprising a magnet coupled to said drive screw and at least one magnetic field sensor configured to provide an output in response to a position of said magnet.

14. A vehicle system according to claim 13, said actuator further comprising first and second magnetic field sensors associated with said first and second positions, respectively, each of said magnetic field sensors providing an associated output in response to a position of said magnet.

15. A vehicle system according to claim 9, said actuator comprising first and second ones of said springs.

16. A vehicle system according to claim 15, wherein said first and second ones of said springs comprise helical coil springs reverse wound with respect to each other.

* * * * *